(12) United States Patent
Kawarasaki (10) Patent No.: US 9,744,596 B2
(45) Date of Patent: Aug. 29, 2017

(54) MACHINE TOOL

(71) Applicant: STAR MICRONICS CO., LTD., Shizuoka (JP)

(72) Inventor: Tetsu Kawarasaki, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/402,417

(22) Filed: Jan. 10, 2017

(65) Prior Publication Data

US 2017/0113279 A1    Apr. 27, 2017

Related U.S. Application Data

(63) Continuation of application No. PCT/JP2015/052286, filed on Jan. 28, 2015.

(30) Foreign Application Priority Data

Aug. 8, 2014 (JP) ................................ 2014-162530

(51) Int. Cl.
| | |
|---|---|
| B23B 7/00 | (2006.01) |
| B23B 7/06 | (2006.01) |
| B23B 13/12 | (2006.01) |
| B23B 25/04 | (2006.01) |
| B23Q 11/08 | (2006.01) |

(52) U.S. Cl.
CPC ............... *B23B 7/06* (2013.01); *B23B 13/12* (2013.01); *B23B 25/04* (2013.01); *B23Q 11/08* (2013.01)

(58) Field of Classification Search
CPC    B23B 7/06; B23B 13/12; B23B 25/04; B23B 2231/28; B23B 2260/058; B23Q 11/08; B23Q 11/0816; B23Q 11/0825; B23Q 11/0866; B23Q 2011/0808
See application file for complete search history.

(56) References Cited

U.S. PATENT DOCUMENTS

| | | | | |
|---|---|---|---|---|
| 3,658,113 A | * | 4/1972 | Loos .................. | B23Q 11/0825 160/202 |
| 4,132,497 A | * | 1/1979 | Weller ................. | B23Q 11/08 408/241 G |

(Continued)

FOREIGN PATENT DOCUMENTS

| | | |
|---|---|---|
| CN | 104185525 | 12/2014 |
| EP | 1982795 | 10/2008 |

(Continued)

*Primary Examiner* — Will Fridie, Jr.
(74) *Attorney, Agent, or Firm* — Lex IP Meister, PLLC (57) ABSTRACT

The invention provides a machine tool eliminating the need of keeping the removed feed-mechanism-protection cover outside the machine. The machine tool comprises a headstock provided with a main spindle for gripping a workpiece; a driving unit provided with a feed mechanism extended along a main spindle axis to move the headstock in a main spindle axial direction; a supporting bed provided with a guide bush in a removable manner; a first cover mounted on the headstock to protect a portion of the feed mechanism with respect to the main spindle axial direction; and a second cover removably mounted on the headstock on the front side of the first cover to protect another portion of the feed mechanism. The second cover is detachably attached to the first cover when removed from the headstock.

4 Claims, 5 Drawing Sheets

(56) References Cited

U.S. PATENT DOCUMENTS

| | | | | |
|---|---|---|---|---|
| 4,484,845 A * | 11/1984 | Pennella, Jr. | ........... | B23Q 11/08 144/251.2 |
| 4,596,162 A * | 6/1986 | Walter | ............... | B23Q 11/0816 74/608 |
| 4,742,609 A * | 5/1988 | Neumann | ................ | B23Q 1/01 29/26 A |
| 6,540,457 B1 * | 4/2003 | Lai | .......................... | B23Q 11/08 108/3 |
| 6,547,498 B1 * | 4/2003 | Sugata | ................... | B23Q 1/015 29/DIG. 59 |
| 2002/0090898 A1 * | 7/2002 | Giebmanns | ............ | B23Q 11/08 451/65 |
| 2005/0082118 A1 * | 4/2005 | Funakoshi | .......... | B23Q 11/0825 182/170 |
| 2006/0133903 A1 * | 6/2006 | Shiraishi | ............... | B23B 39/161 408/199 |
| 2007/0227317 A1 * | 10/2007 | Asahara | .................. | B23B 3/161 82/119 |
| 2008/0258410 A1 * | 10/2008 | Yamane | ............. | B23Q 11/0825 277/637 |
| 2011/0017410 A1 * | 1/2011 | Yamashita | .......... | B23Q 11/0825 160/222 |
| 2012/0317884 A1 * | 12/2012 | Park | ....................... | B23Q 11/08 49/370 |
| 2016/0158846 A1 * | 6/2016 | Gardner | .................. | B23B 25/04 82/152 |
| 2016/0158905 A1 * | 6/2016 | Gardner | ............. | B23Q 11/0891 362/89 |

FOREIGN PATENT DOCUMENTS

| | | |
|---|---|---|
| EP | 2832476 | 2/2015 |
| JP | 09-225703 | 9/1997 |
| JP | 2003-311562 | 11/2003 |
| JP | 2008-264925 | 11/2008 |
| TW | 201404501 | 2/2014 |
| WO | 2013/146898 | 10/2013 |

* cited by examiner

FIG. 8

MACHINE TOOL

CROSS-REFERENCE TO RELATED APPLICATION

The present application is a continuation of PCT Application No. PCT/JP2015/052286, filed on Jan. 28, 2015, which claims priority of Japanese Patent Application No. 2014-162530 filed on Aug. 8, 2014. The contents of this application are incorporated herein by reference in their entirety.

BACKGROUND (a) Field

The present invention relates to a machine tool provided with a headstock movable in the axial direction of a main spindle.

(b) Description of the Related Art

A sliding headstock type lathe is conventionally known in which a workpiece is slidably supported by a guide bush mounted on the front side of the main spindle. A headstock provided with the main spindle is movalble in the axial direction of the main spindle by a driving unit including a ball screw (feed mechanism) mounted in the axial direction, a nut mounted on the headstock to be engaged with the ball screw, and a servo motor for rotatably driving the ball screw. The headstock is provided with a ball screw cover for safety or for protection, for example, from workpiece dust.

In a sliding headstock type lathe disclosed in Japanese Patent Application Publication No. H9-225703, a guide bush holder is detachably mounted on a supporting bed. When the guide bush is not used, the guide bush holder is replaced by a cover having a protective hole into which the leading end of the main spindle is to be inserted. The replacement cover is not a cover for the ball screw.

SUMMARY

In the conventional sliding headstock type lathe, when the guide bush is not used, the headstock needs be shifted toward the front side with respect to the axial direction of the main spindle to match the position of the replacement cover. It is assumed that the headstock is provided with a front ball screw cover and a rear ball screw cover for safety and protection when the guide bush is used. It is also assumed that the front ball screw cover is removed and the headstock is accordingly shifted toward the front side with respect to the axial direction of the main spindle when the guide bush is not used. The removed front ball screw cover needs be kept outside the machine to prevent loss or damage Such problem is not limited to a lathe provided with a ball screw, but to a machine tool provided with a driving unit having a feed mechanism such as a linear motor stator.

The present invention is to provide a machine tool provided with a protection cover for a feed mechanism capable of emilinating the need of keeping the removed cover outside the machine.

A machine tool comprises a headstock provided with a main spindle for gripping a workpiece; a driving unit provided with a feed mechanism extended along a main spindle axis to move the headstock in a main spindle axial direction; a supporting bed provided with a guide bush in a removable manner, the guide bush slidably supporting the workpiece on the front side of the main spindle; a first cover mounted on the headstock to protect a portion of the feed mechanism with respect to the main spindle axial direction; and a second cover removably mounted on the headstock on the front side of the first cover to protect another portion of the feed mechanism; wherein, the second cover is detachably attached to the first cover when removed from the headstock.

According to the first aspect of the present invention, a machine tool capable of eliminating the need of keeping the removed feed-mechanism-protection cover outside the machine is provided. According the second aspect of the invention, a machine tool of a reduced size is provided. According to the third aspect of the invention, a cover of simplified structure is provided.

DETAILED DESCRIPTION

An embodiment of the present invention is being described. The embodiment is only an example of the invention. The features included in the embodiment are not necessarily essential to a solution of the invention.

(1) Summary of Technology Included in the Invention

A summary of technology included in the present invention is being described referring to the drawings schematically showing a sliding headstock type lathe 1 as an example of a machine tool. The schematic drawings may have a mismatch to each other.

A machine tool 1 of the invention includes a headstock 10 provided with a main spindle 12 for gripping a workpiece W1, a driving unit 20, a supporting bed 30 on which a guide bush 32 is removably mounted, a first cover (rear cover) 40, and a second cover (front cover) 50. The driving unit 20 includes a feed mechanism 22 extended along a main spindle axis AX1 to move the headstock 10 in a main spindle axial direction D1. The guide bush 32 is adapted to slidably support the workpiece W1 on the front side (a front side 51) of the main spindle 12. The first cover 40 is mounted on the headstock 10 to cover a portion of the feed mechanism 22 with respect to the main spindle axial direction D1. The second cover 50 is removably mounted on the headstock 10 to cover a portion of the feed mechanism 22 on the front side of the first cover 40.

Figure 7:
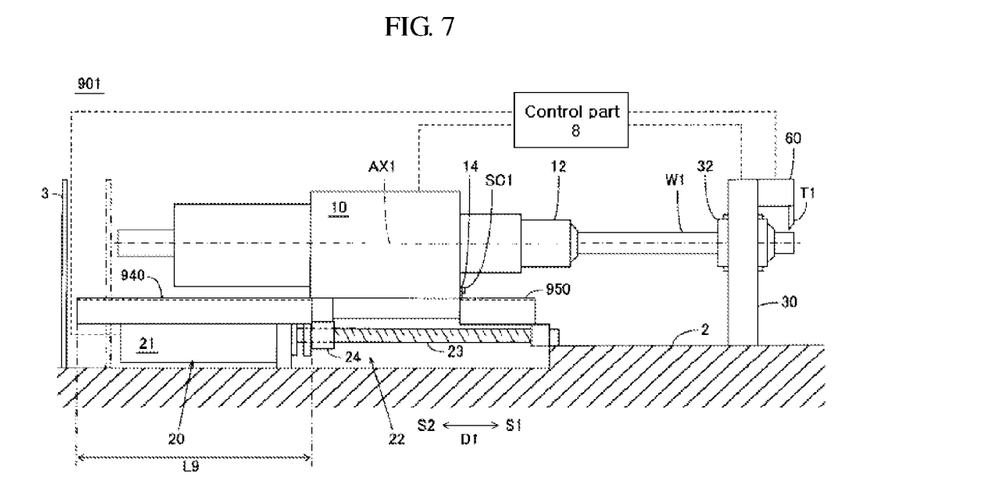
FIG. 7 is a schematic partial sectional view of part of a lathe provided with a guide bush in a comparative example.
Figure 8:
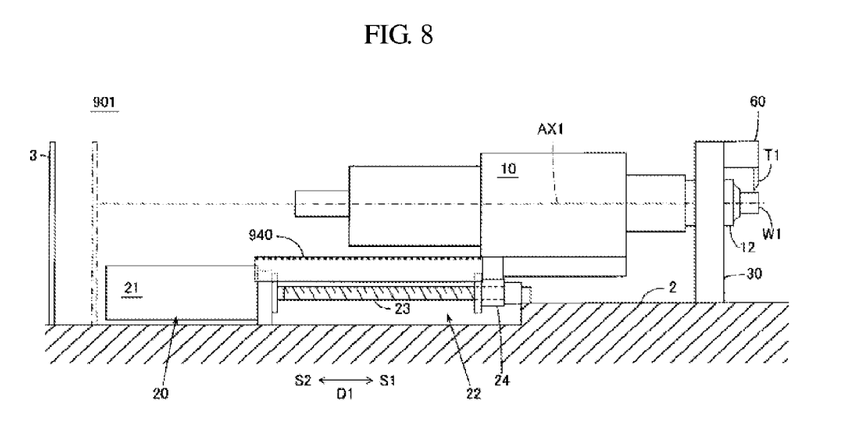
FIG. 8 is a schematic partial sectional view of part of the lathe without the guide bush in the comparative example.

FIG. 7 and FIG. 8 are schematic partial sectional drawings of a sliding headstock type lathe 901 in a comparative example. The headstock 10 is provided with a front cover 950 for the front side S1 of a ball screw 23 and a rear cover 940 for a rear side S2 thereof for safety and protection. The front cover 950 is extended along the main spindle axis AX1 to cover the front side Si of the ball screw 23 even when the headstock 10 is in the most retracted position as shown in FIG. 7. When the guide bush 32 is removed from the supporting bed 30 as shown in FIG. 8, the front cover 950 is removed from the headstock 10 to prevent interference with the supporting bed 30. The removed front cover 950 needs be kept outside the machine to prevent loss or damage.

In the invention as shown in FIG. 1 to FIG. 6, when the guide bush 32 is used, the second cover 50 is mounted on the headstock 10 on the front side Si of the first cover 40 to protect the feed mechanism 22 on the front side of the first cover 40. When the guide bush 32 is not used, the second cover 50 may be removed from the headstock 10 and the removed second cover 50 may be attached to the first cover 40. The configuration of the invention provides a machine tool eliminating the need of keeping the removed feed-mechanism-protection cover outside the machine. The cover may be attached to a component such as a metal fitting mounted on the headstock. The second cover may be attached to a component such as a metal fitting mounted on the first cover.

The second cover 50 may be attached to the first cover 40 to cover a portion of the feed mechanism 22 on the rear side S2 of the first cover 40. In the comparative example of FIG. 7 and FIG. 8, the rear cover 940 is of the length L9 along the main spindle axis AX1 to cover the rear side S2 of the ball screw 23 even when the headstock 10 is in the most advanced position as shown in FIG. 8. In the invention, when the guide bush is not used, the feed mechanism 22 on the rear side S2 of the first cover 40 is protected by the attached second cover 50. The first cover 40 can be thereby shortened with respect to the main spindle axial direction D1, thus reducing the machine tool in size.

As shown in FIG. 1 to FIG. 4, the second cover 50 may be attached to the first cover 40 via a mounting structure (a through hole 52) provided on the second cover 50 through which the second cover 50 has been mounted on the headstock 10. This configuration eliminates the need of providing the second cover 50 with another mounting structure with respect to the first cover 40, thus simplifying the cover in structure.

Figure 1:
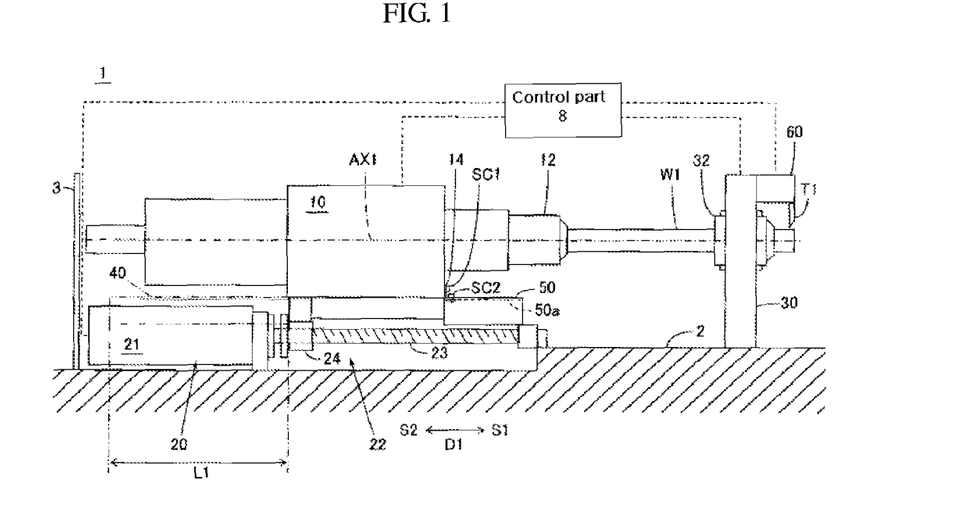
FIG. 1 is a schematic partial sectional view of part of a lathe when a guide bush is used.
Figure 2:
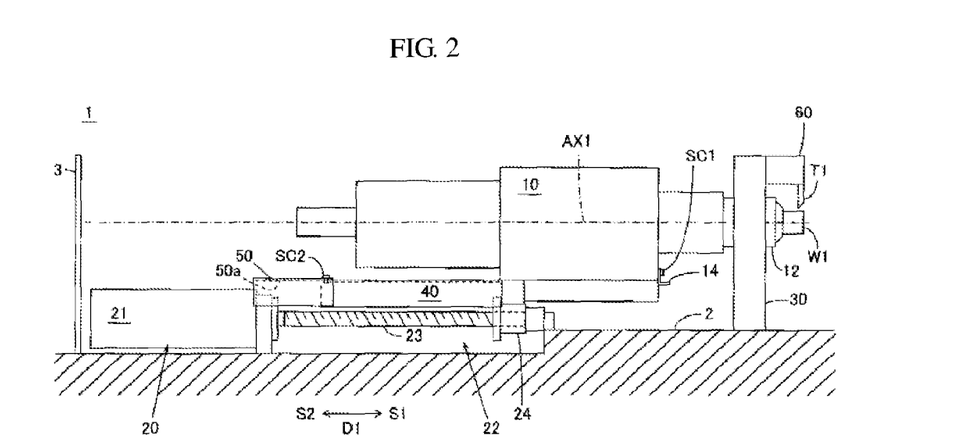
FIG. 2 is a schematic partial sectional view of part of the lathe when the guide bush is not used.
Figure 3:
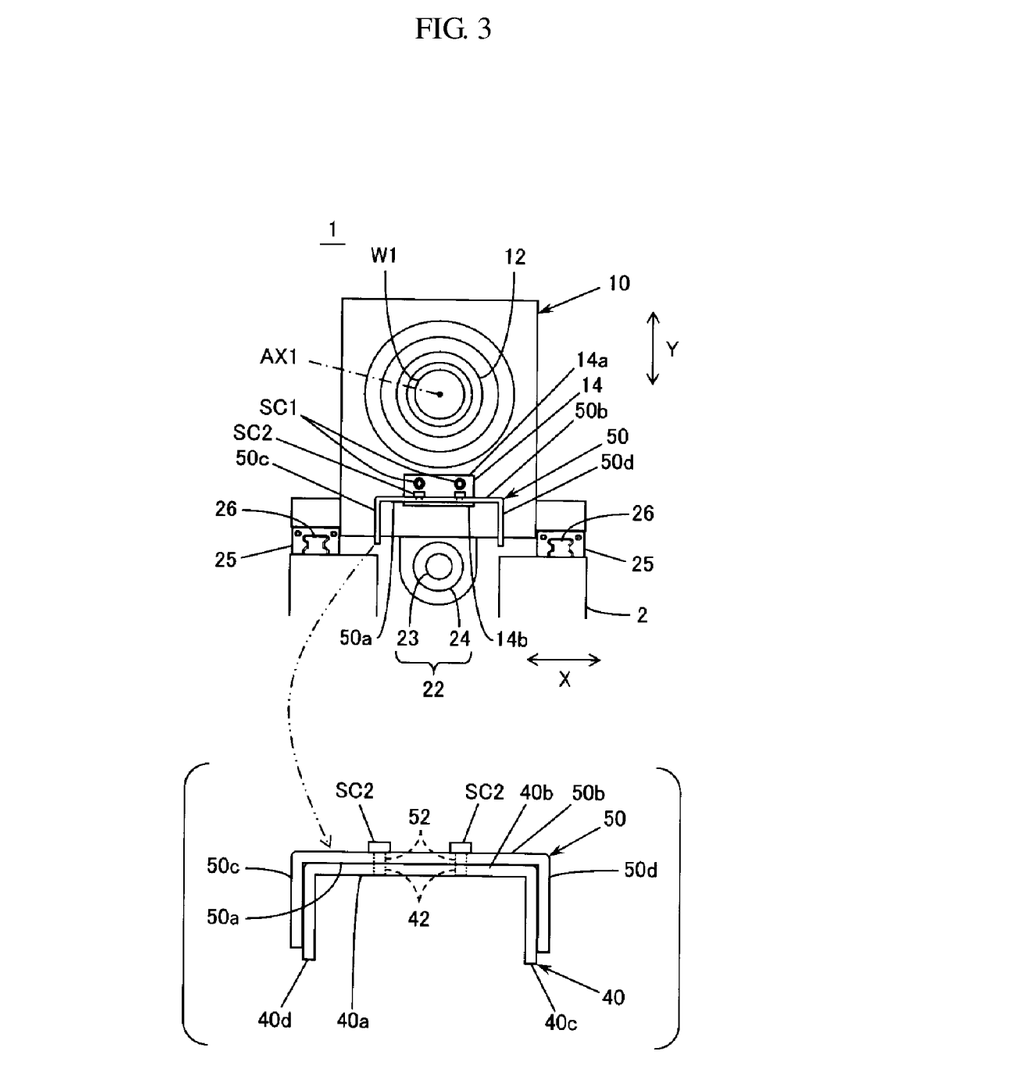
FIG. 3 is a schematic view of part of the lathe viewed from the axial direction of a main spindle.
Figure 4:
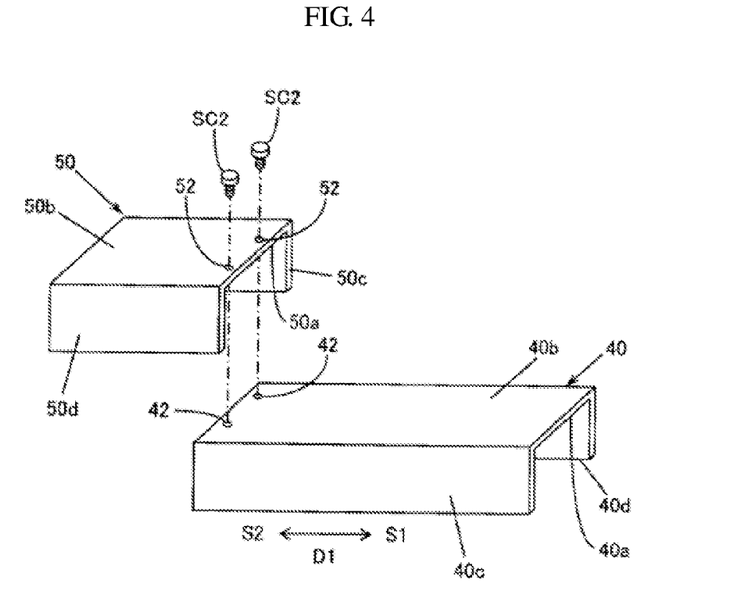
FIG. 4 is a schematic view of a manner in which a front cover is attached to a rear cover.

(2) An embodiment of the invention is being described. FIG. 1 is a schematic partial sectional view of part of the sliding headstock type lathe (machine tool) 1 with the headstock 10 in the most retracted position when the guide bush is used. FIG. 1 shows the first cover (rear cover) 40 in two-dot chain and the driving unit 20. FIG. 2 is a schematic partial sectional view of part of the lathe 1 with the headstock 10 is in the most advanced position when the guide bush is not used. FIG. 3 is a schematic view of part of the lathe viewed from the main spindle axial direction D1. FIG. 3 shows a view from the front side Si when the guide bush is used showing the lathe with the supporting bed 30 omitted, and another view from the rear side S2 when the guide bush is not used showing the covers 40 and 50. FIG. 4 schematically shows an example of the second cover (front cover) 50 being attached to the first cover (rear cover) 40. The first cover 40 and the second cover 50 are respectively referred to as the rear cover 40 and the front cover 50 based on their positional relationship when the guide bush is used. The front cover 50 is attached to the rear side of the rear cover 40 when the guide bush is not used.

The lathe 1 as shown in FIG. 1 to FIG. 4 includes a bed 2, a control part 8, the headstock 10, the driving unit 20, the supporting bed 30, the covers 40 and 50, and a tool post 60.

The bed 2 is also referred to as a table, constituting a supporting base for the headstock 10, the driving unit 20, and the supporting bed 30. The control part 8 controls operation of the headstock 10, the driving unit 20, the supporting bed 30, and the tool post 60. The main spindle 12 mounted on the headstock 10 releasably grips the cylindrical (bar-shaped) workpiece W1 inserted in the main spindle axial direction D1. The workpiece W1 is rotated on the main spindle axis AX1 along the longitudinal direction of the workpiece W1. The headstock 10 having the main spindle 12 mounted thereon is movable in the main spindle axial direction D 1. A metal fitting 14 of an approximately L-shape is fastened to the front side of the headstock 10 by a screw SC1 to secure the front cover 50 to the headstock 10. The metal fitting 14 has a through hole for the screw SC1 on the vertical portion thereof and a screw hole for a screw SC2 on the horizontal portion thereof. The metal fitting 14 or a corresponding part may be integrally formed with the headstock 10.

The driving unit 20 includes a NC-controllable servo motor 21 and the feed mechanism 22 extended along the main spindle axis AX1, thereby moving the headstock 10 in the main spindle axial direction Dl. The feed mechanism 22 includes the ball screw 23 extended along the main spindle axis AX1 and a nut 24 engaged with the ball screw 23. The ball screw 23 is rotatably driven by the servo motor 21 around a rotational axis extended along the main spindle axis AX1. The nut 24 is fixed to the headstock 10 and moved in the main spindle axial direction D1 in accordance with the rotation of the ball screw 23. As shown in FIG. 3, a pair of rails 26 are mounted on the bed 2 with its longitudinal direction oriented in the main spindle axial direction Dl. A pair of guides 25 are mounted on the headstock 10 with its longitudinal direction oriented in the main spindle axial direction D1. Each of the guides 25 slides on each of the rails 26. The guide and rail combinations are provided across the ball screw 23 in a horizontal X-axis direction perpendicular to the main spindle axial direction D1. The guides 25 and the rails 26 may be exchangeable.

The guide bush 32 mounted on the supporting bed 30 is disposed on the front side of the main spindle 12 to support the long workpiece W1 inserted through the main spindle 12 in a slidable manner in the main spindle axial direction D1. The guide bush 32 is rotationally driven around the main spindle axis AX1 in synchronization with the main spindle 12. The guide bush 32 is mounted on the supporting bed 30 in a detachable manner. The guide bush 32 prevents a deflection of the workpiece, thereby improving machining accuracy. As shown in FIG. 1, when the guide bush 32 is mounted on the supporting bed 30, the headstock 10 is driven to allow the main spindle 12 to move in the main spindle axial direction D1 within a range on the rear side S2 of the guide bush 32. Undesirably, however, a longer portion of the workpiece W1 between the main spindle 12 and the guide bush 32 is possibly left uncut. Further undesirably, since the outer circumferential surface of the workpiece W1 is held by the guide bush 32, a cut workpiece W1 is not permitted to be once retracted into the guide bush 32 and then advanced again for another operation. The guide bush 32 is therefore removably mounted on the supporting bed 30 as shown in FIG. 2. When the guide bush 32 is removed, the headstock 10 is driven to allow the main spindle 12 to move in the main spindle axial direction D1 within a range on the front side Si forward of the range when the guide bush 32 is mounted, thereby shortening the distance from the main spindle 12 to the tool post 60.

The rear cover (first cover) 40 is fixed to the headstock 10 to cover a portion of the ball screw 23 behind the nut 24 on the rear side S2 with respect to the main spindle axial direction D1. As shown in FIG. 3 and FIG. 4, the rear cover 40 comprises a substantially-flat base 40b and side sections 40c and 40d respectively extended downward from the edges of the base 40b with respect to the X-axis direction. A groove 40a opening downward is thereby formed with the longitudinal direction oriented in the main spindle axial direction D1. The base 40b is provided with a screw hole 42 near the rear end thereof with respect to the main spindle axial direction DE The number of the screw hole 42 may be two as shown in FIG. 4 or may be one, three or more.

The front cover (second cover) 50 is mounted on the headstock 10 in a detachable manner to cover a portion of the ball screw 23 ahead the nut 24 on the front side S2 with respect to the main spindle axial direction Dl. As shown in FIG. 3 and FIG. 4, the front cover 50 comprises a substantially-flat base 50b and side sections 50c and 50d respectively extended downward from the edges of the base 50b with respect to the X-axis direction. A groove 50a opening downward is thereby formed with the longitudinal direction oriented in the main spindle axial direction D1. The groove 50a may be of a size enough to accommodate the rear cover 40 therein. The base 50b is provided with the through hole 52 for the screw SC2 near the end thereof with respect to the main spindle axial direction D1. The through hole 52 is disposed near the rear end of the front cover 50 when the guide bush 32 is used while near the front end of thereof when the guide bush 32 is not used. The number of the through hole 52 may be two as shown in FIG. 4 or may be one, three or more.

The front cover 50 has a length along the main spindle axis AX1 to cover the front end of the ball screw 23 even when the headstock 10 is in the most retracted position when the guide bush is used as shown in FIG. 1. The rear cover 40 has the length L1 along the main spindle axis AX1 to cover the rear end of the ball screw 23 even when the headstock 10 is in the most advanced position when the guide bush is used and also to cover the rear end of the ball screw 23 in cooperation with the front cover 40 even when the headstock 10 is in the most advanced position when the guide bush is not used as shown in FIG. 2. The rear end of the ball screw 23 is covered by the front cover 50, not by the rear cover 40 when the headstock 10 is in the most advanced position when the guide bush is not used.

The tool post 60 is mounted on the supporting bed 30. A plurality of tools T1 are attached to the tool post 60 in a movable manner in the X-axis direction and a Y-axis direction perpendicular to both of the main spindle axial direction D1 and the X-axis direction. The tool T1 includes a stationary tool such as a turning tool and a rotary tool such as a drill.

Further, a back working attachment provided with a back working spindle (sub spindle) may be provided on the bed 2 to releasably grip the front-operated workpiece W1 inserted in the main spindle axial direction D1. The above described components 2 and 10 to 60 may be made of metal.

A procedure of attaching or removing the guide bush 32 is being described. When the guide bush 32 is used, the guide bush 32 is attached to the supporting bed 30 as shown in FIG. 1 and the front cover 50 is attached to the front side of the headstock 10 via the metal fitting 14. Specifically, a horizontal part 14b of the metal fitting 14 is inserted into the groove 50a of the front cover 50 with the though hole 52 side thereof directed to the rear side S2. The front cover 50 is then fastened to the metal fitting 14 by the screw SC2 with the through hole 52 of the front cover 50 aligned with a screw hole of the horizontal part 14b. The front cover 50 is thereby attached to the headstock 10 via the metal fitting 14. To machine the workpiece W1 supported by the guide bush 32, the headstock 10 is driven in the main spindle axial direction D1 within the range as far as the rear end of the ball screw 23 is covered by the rear cover 40 while the front end of the ball screw 23 is covered by the front cover 50.

When the guide bush 32 is not used, the guide bush 32 is removed from the supporting bed 30 as shown in FIG. 2 and the front cover 50 is detached from the metal fitting 14 by removing the screw SC 2. The rear cover 40 is inserted into the groove 50a of the front cover 50 with the though hole 52 side of the front cover 50 directed to the front side S1. The front cover 50 is then fastened to the rear cover 40 by the screw SC2 with the through hole 52 of the front cover 50 aligned with the screw hole 42 of the rear cover 40 as shown in FIG. 2 to FIG. 4. The front cover 50 attached to the rear cover 40 extends the protection range for the ball screw 23 toward the rear side S2. To machine the workpiece W1 gripped by main spindle 12, the headstock 10 is driven in the main spindle axial direction D1 within a range to the extent that the rear end of the ball screw 23 is covered by the front cover 50 extended from the rear cover 40.

As described above, the removed front cover 50 can be attached to the rear cover 40, eliminating the need of keeping the removed front cover 50 outside the machine.

Since the removed front cover 50 is attached to the rear cover 40 to cover the portion of the ball screw 23 on the rear side S2 behind the rear cover 40, the length L1 (FIG. 1) of the rear cover 40 along the main spindle axis AX1 can be shortened to the extent that the rear end of the ball screw 23 is covered by the front cover 50 extended from the rear cover 40. In the comparative example as shown in FIG. 7 and FIG. 8, a housing 3 is arranged on the rear side S2 in a position to avoid interference with the rear cover 940 in the most retracted position when the guide bush is used. In the invention as shown in FIG. 1 and FIG. 2, however, the housing 3 can be shifted toward the front side S1 without interference with the rear cover 40 having the shorter length L1. The embodiment thereby reduces the size of the machine tool.

Further, the mounting structure (the through hole 52) of the front cover 50 with respect to the headstock 10 may be used to attach the front cover 50 to the rear cover 40. This configuration eliminates the need of providing the front cover 50 with another mounting structure (another through hole) with respect to the rear cover 40, thus simplifying the front cover 50 in structure and making the screw common to the metal fitting 14 and the rear cover 40. If the screw and the through hole are made common, the front cover provided with a non-removable screw with a washer inserted into the through hole may be used.

(3) A modified embodiment of the invention is being described. For example, the feed mechanism protected by the cover may not be limited to the ball screw engaged with the nut but another mechanism such as a linear motor stator and a rack gear engaged with a pinion gear. The front cover 50 may be attached to the rear cover 40 in a manner that it is inserted into the groove 40a of the rear cover 40. The front cover 50 may be attached to the rear cover 40 within the range of the length L9 of the rear cover 40 (FIG. 7 and FIG. 8) without extension to the rear side S2 behind the rear cover 40 though without the advantage of machine size reduction. Either of the front cover and the rear cover may be of another type such as an accordion fold so as to be changeable in length with respect to the main spindle axial direction D1.

The rear cover 40 may be provided without one or all of the side sections 40c and 40d. The front cover 50 may be provided without one or all of the side sections 50c and 50d. The invention may be applied to another machine tool except the lathe.

Figure 5:
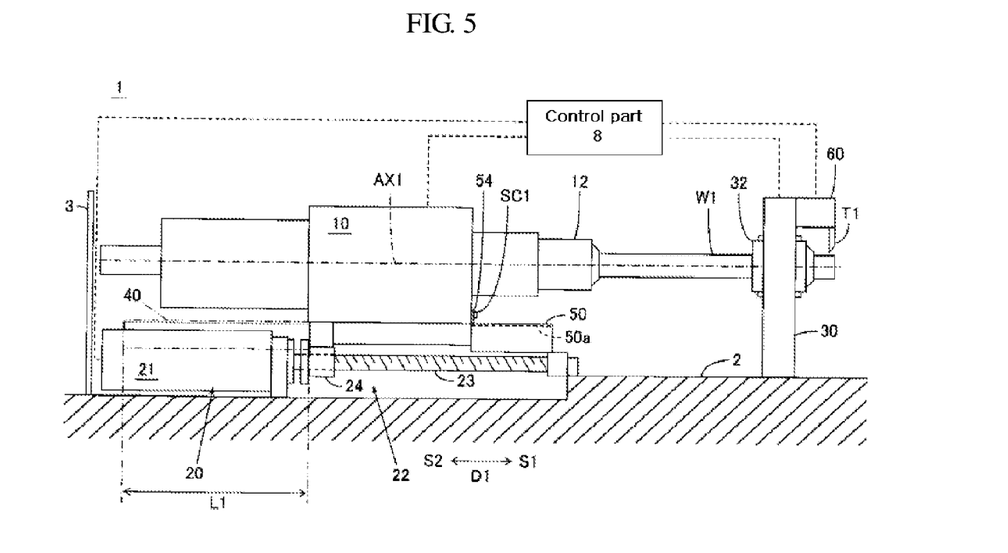
FIG. 5 is a schematic partial sectional view of part of a lathe when the guide bush is used in a modified embodiment.
Figure 6:
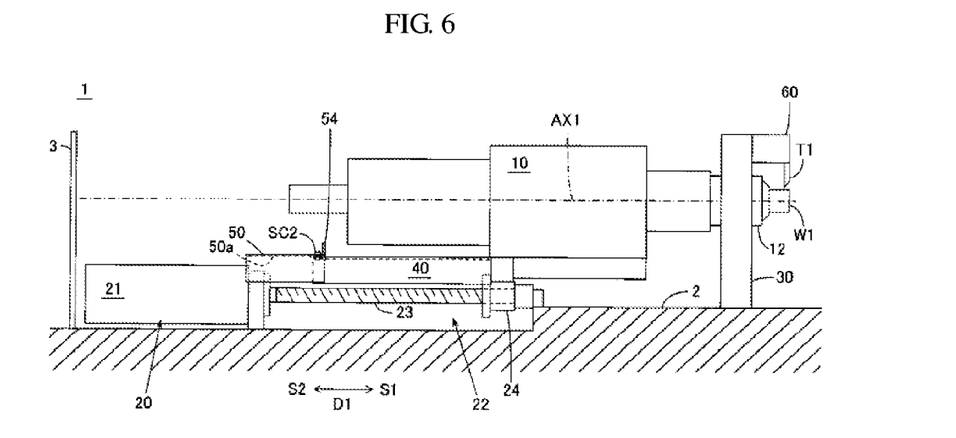
FIG. 6 is a schematic partial sectional view of part of the lathe when the guide bush is not used in the modified embodiment.

As shown in FIG. 5 and FIG. 6, the front cover 50 may have a through hole for attachment to the rear cover 40 in addition to the though hole for attachment to the headstock 10. FIG. 5 is a schematic partial sectional view of part of a lathe when the guide bush is used in a modified embodiment. FIG. 5 shows the rear cover 40 in two-dot chain and the driving unit 20. FIG. 6 is a schematic partial sectional view of part of the lathe when the guide bush is not used in the modified embodiment. The front cover 50 except for a bent portion 54 and the rear cover 40 are the same as those in FIG. 3 and FIG. 4. The same symbol is being used for the same element for which the explanation is being omitted.

The headstock 10 as shown in FIG. 5 and FIG. 6 is not provided with the metal fitting 14 and instead the bent portion 54 is formed at the end of the front cover 50 with respect to the main spindle axial direction D1. The bent portion 54 has a through hole for the screw SC1 to be engaged with the screw hole formed at the front part of the headstock 10. The base 50b of the front cover 50 in the vicinity of the bent portion 54 has the through hole 52 for the screw SC2 to be engaged with the screw hole 42 of the base 40b of the rear cover 40.

When the guide bush 32 is used, the front cover 50 is attached to the headstock 10 as shown in FIG. 5 by the screw SC1 with the though hole of the bent portion 54 of the front cover 50 directed to the rear side S2 aligned with the screw hole on the front side of the headstock 10. When the guide bush 32 is not used, the front cover 50 is detached from the headstock 10 by removing the screw SC1. The rear cover 40 is inserted into the groove 50a of the front cover 50 with the though hole 52 side of the front cover 50 directed to the front side 51. The front cover 50 is then fastened to the rear cover 40 by the screw SC2 with the through hole 52 of the front cover 50 aligned with the screw hole 42 of the rear cover 40 as shown in FIG. 6. The front cover 50 attached to the rear cover 40 extends the protection range for the ball screw 23 toward the rear side S2. The screws SC1 and SC2 may be the same screw.

In the modified embodiment, the front cover 50 may be removed from the headstock 10 and the removed front cover 50 may be attached to the rear cover 40. The configuration of the invention provides a machine tool eliminating the need of keeping the removed front cover outside the machine. The ball screw 23 on the rear side S2 behind the rear cover 40 is protected by the front cover 50 attached to the rear cover 40. The rear cover 40 can be thereby shortened with respect to the main spindle axial direction D1, thus reducing the machine tool in size.

The invention is capable of providing a machine tool eliminating the need of keeping the removed feed-mechanism-protection cover outside the machine in various embodiments. The basic functions and effects are available even if the technology includes only the elements in the independent claim (including the embodiment) and not the elements in the dependent claims. The invention includes any replacement or exchange of the configurations disclosed in the embodiments and the modifications. The invention also includes any replacement or exchange of the prior arts and the configurations disclosed in the embodiments and the modifications.

What is claimed is:

1. A machine tool comprising:
    a headstock provided with a main spindle for gripping a workpiece;
    a driving unit provided with a feed mechanism extended along a main spindle axis to move the headstock in a main spindle axial direction;
    a supporting bed provided with a guide bush in a removable manner, the guide bush slidably supporting the workpiece on the front side of the main spindle;
    a first cover mounted on the headstock to protect a portion of the feed mechanism with respect to the main spindle axial direction; and
    a second cover removably mounted on the headstock on the front side of the first cover to protect another portion of the feed mechanism,
    wherein the second cover is detachably attached to the first cover when removed from the headstock.

2. The machine tool of claim 1, wherein the second cover removed from the headstock is attached to the first cover in a manner to cover the portion of the feed mechanism behind the first cover.

3. The machine tool of claim 1, wherein a mounting structure of the second cover with respect to the headstock is used to attach the second cover to the first cover.

4. The machine tool of claim 2, wherein a mounting structure of the second cover with respect to the headstock is used to attach the second cover to the first cover.

* * * * *